Sept. 21, 1948. G. F. JOHNSON 2,449,943
METHOD OF MAKING ANTIFRICTION BEARINGS
Filed April 25, 1945 3 Sheets-Sheet 1
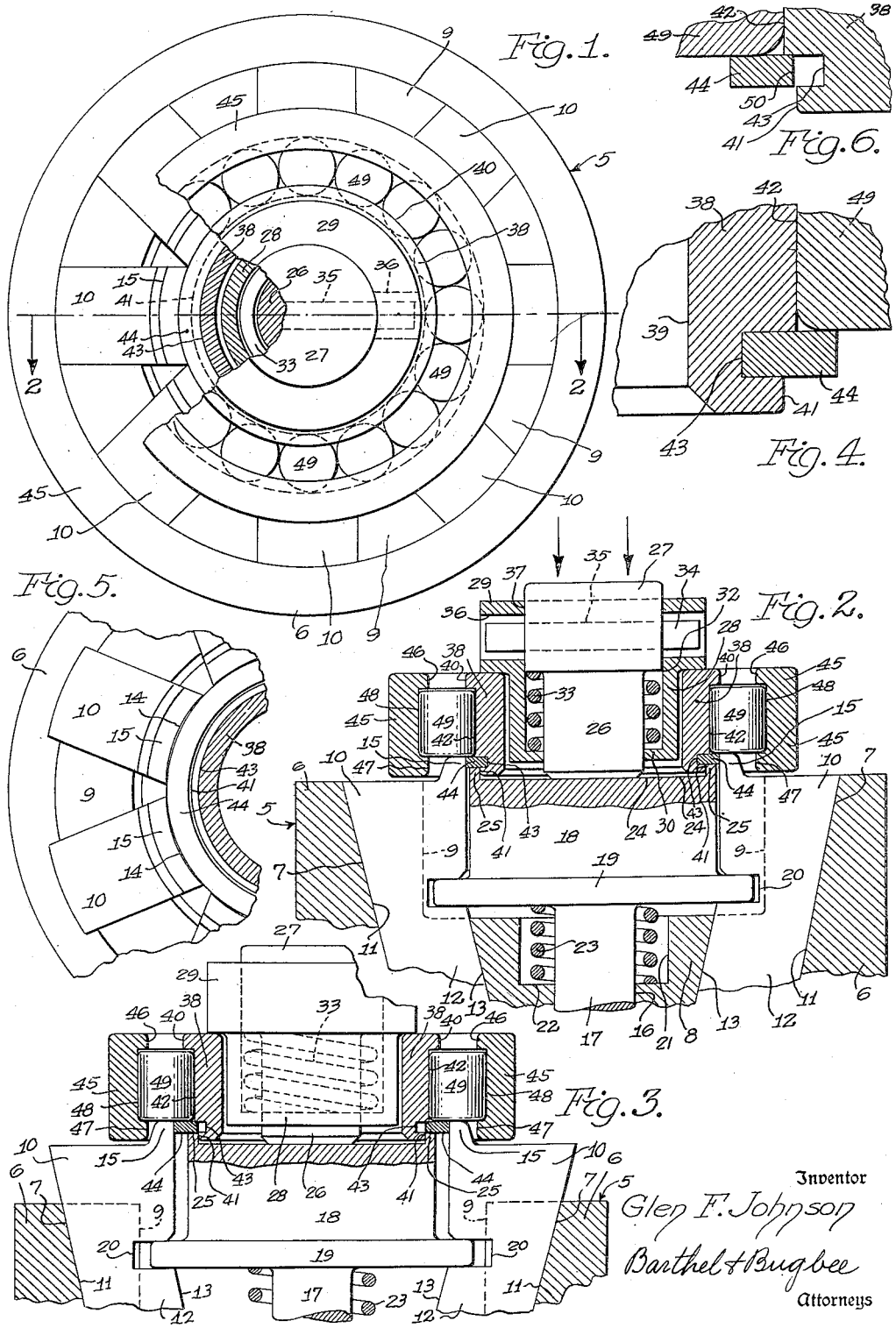
Inventor
Glen F. Johnson
Barthel & Bugbee
Attorneys Sept. 21, 1948.  G. F. JOHNSON  2,449,943
METHOD OF MAKING ANTIFRICTION BEARINGS
Filed April 25, 1945  3 Sheets-Sheet 2
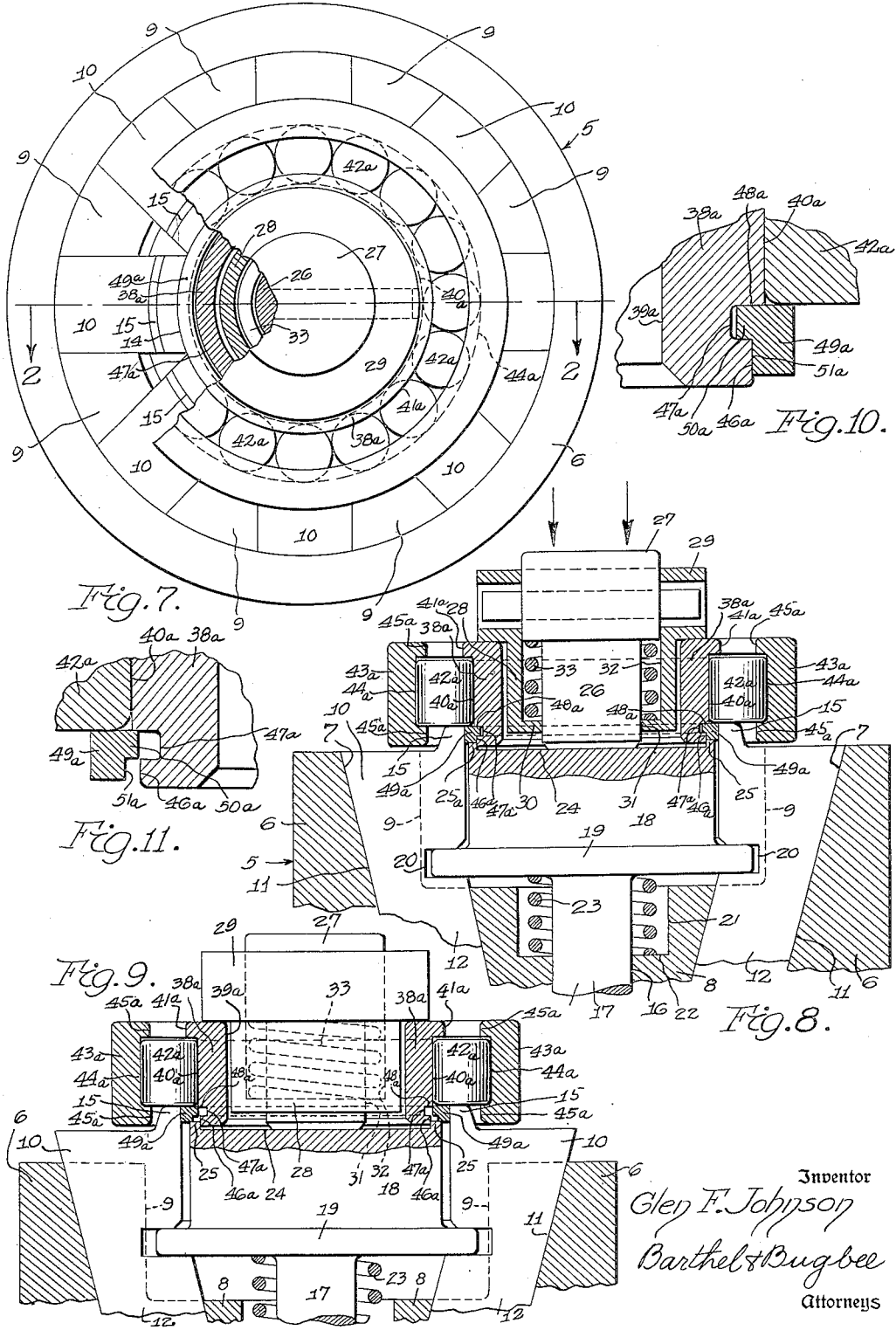
Inventor
Glen F. Johnson
Barthel & Bugbee
Attorneys Sept. 21, 1948.    G. F. JOHNSON    2,449,943
METHOD OF MAKING ANTIFRICTION BEARINGS
Filed April 25, 1945    3 Sheets-Sheet 3
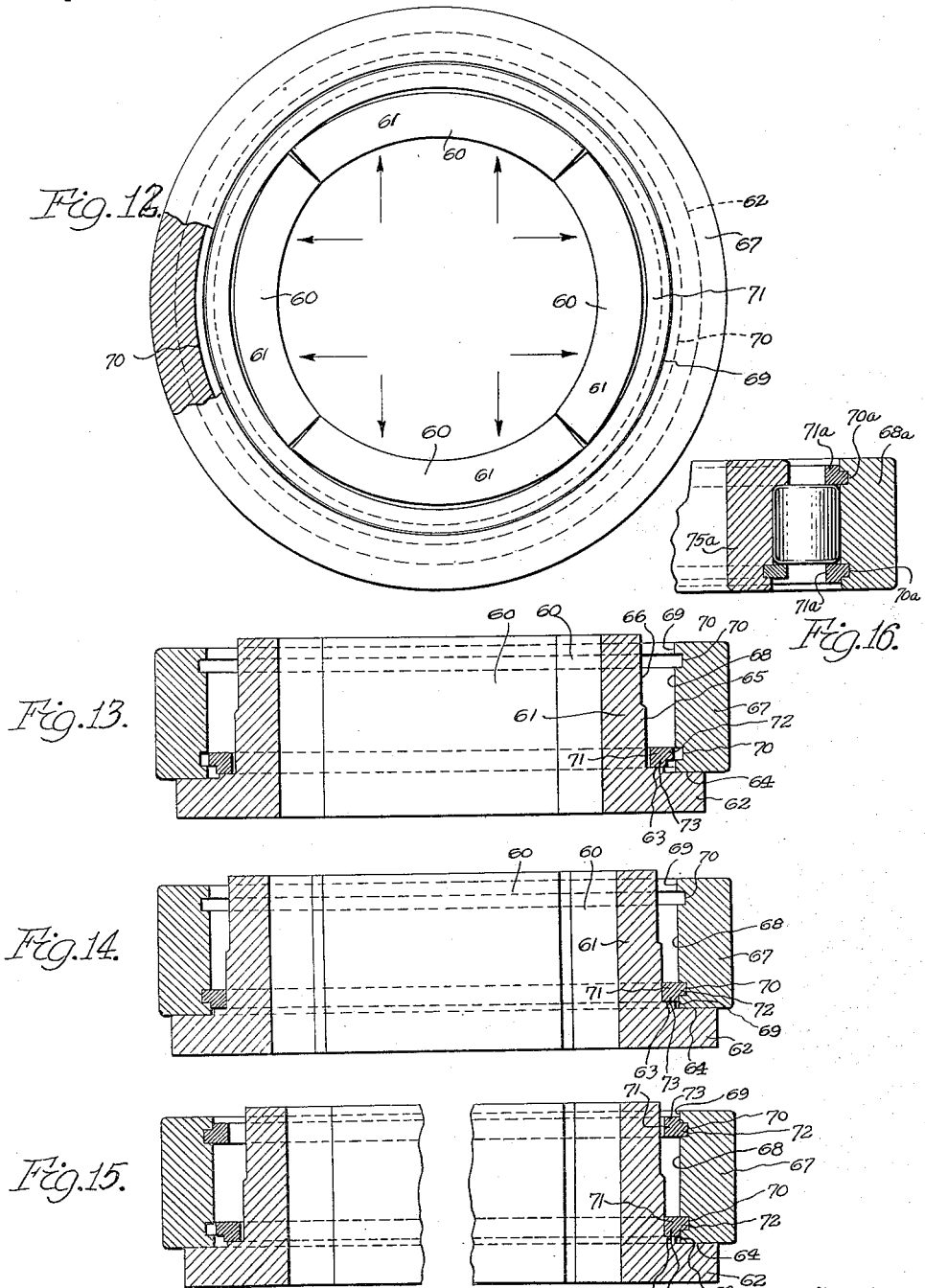
Inventor
Glen F. Johnson
By Barthel & Bugbee
Attorneys Patented Sept. 21, 1948

2,449,943

UNITED STATES PATENT OFFICE 2,449,943

METHOD OF MAKING ANTIFRICTION BEARINGS

Glen F. Johnson, Detroit, Mich., assignor to Bower Roller Bearing Company, Detroit, Mich., a corporation of Michigan Application April 25, 1945, Serial No. 590,283

4 Claims. (Cl. 29—148.4)

The present invention relates to anti-friction bearing assemblies, and more particularly, to a method for assembling the retainer ring to hold the bearing parts and anti-friction rolls or the like in proper relation.

The primary object of the invention is to provide a bearing assembly in which the component parts thereof are held in assembled relation by a retainer ring so arranged and constructed as to withstand axial thrusts without causing separation of said bearing parts when said bearing is subjected to axial thrusts.

Another object of the invention is to provide a bearing assembly and method of seating a retaining or locking ring in one of the component bearing parts of said assembly whereby said parts will be held in assembled relation and will withstand axial thrusts as well as radial thrusts.

Another object of the invention is to provide a continuous retainer or locking ring for holding bearing assemblies in their operative position and to provide a novel method of inserting said locking ring, whereby said locking or retaining ring will be permanently held in place in one of the component bearing members against displacement by axial thrusts and radial thrusts.

Another object of the invention is to provide a method for seating said locking or retaining ring within an annular groove or recess in one of the component bearing members with the retaining or locking ring arranged so that one wall of said ring will form a thrust surface against which the anti-friction rollers or the like may engage.

Another object of the invention is to provide a bearing assembly having inner and outer bearing race members, one of which is provided with an annular recess at one end thereof for receiving a continuous uninterrupted locking or retaining ring which is adapted to be seated in said annular recess or groove by exerting a radial pressure thereon so as to cause said ring to be permanently held in said recess.

Another object of the invention resides in forming the peripheral surface of one of said component bearing members of such a diameter as to slidably receive said locking and retaining ring, whereby the same may be brought into registry with the annular groove or recess therein and proceed into seating engagement with said groove or recess by exerting a radial force perpendicular to the peripheral surface of said retaining ring at equidistant circumferentially spaced apart angular distances.

Another object of the invention is to provide a bearing assembly and method of making the same which includes inner and outer bearing race members between which is disposed a series of anti-friction elements adapted to be held in position by means of a continuous retaining or locking ring of rectangular cross section adapted to be received in an annular groove or recess in one or both of the bearing race members adjacent the end thereof so as to engage the end walls of the anti-friction bearing members and form a retaining shoulder therefor.

Another object of the invention is to provide a bearing assembly and method of making the same which includes inner and outer bearing race members between which is disposed a series of anti-friction elements adapted to be held in position by means of a continuous retaining or locking ring of L-shaped cross-section adapted to be received in an annular groove or recess in one or both of the bearing race members adjacent the end thereof so as to engage the end walls of the anti-friction bearing members and form a retaining shoulder therefor.

Another object of the invention is to provide a bearing assembly in which inner and outer bearing race members are arranged concentrically in spaced apart relation to facilitate the positioning of anti-friction rollers or other elements therebetween with either the inner or the outer race member machined at one or both ends thereof to provide a land surface thereat and formed with an adjacent groove for receiving a portion of a locking or retaining ring of L-shaped cross-section so that the remaining portion will be forced into tight engagement with the land on said race member or members, the locking ring providing an abutment for the anti-friction rollers or the like at one or both ends of the bearing assembly.

Other objects and advantages of the invention will become apparent during the course of the following description of the accompanying drawings, wherein:

Figure 1 is a top elevational view of a fixture or compressing die member employed for seating the locking or retaining ring in a peripheral groove in one of the race members of the bearing assembly, the bearing being shown in position with portions thereof broken away to illustrate the manner in which the forming die members are forced into engagement with the locking or retaining ring at circumferentially spaced apart angular distances in a direction perpendicular to the peripheral surface of said ring;

Figure 2 is a vertical cross-sectional view taken on line 2—2 of Figure 1 looking in the direction of the arrows and further showing the manner in which the assembled bearing parts are arranged on the compressing and forming die member so as to seat said locking ring in an annular groove in the inner race member of said bearing assembly;

Figure 3 is a vertical cross sectional view similar to Figure 2 showing the manner in which the locking ring is supported by the compressing fixture or die member prior to the seating thereof within the annular groove in one end of the inner race member or cone;

Figure 4 is a fragmentary cross-sectional view of the inner race member or cone, showing the manner in which the retaining or locking ring is positioned and seated within the annular groove in the inner race member;

Figure 5 is a fragmentary top elevational view of the fixture or compressing die member illustrating the bearing member in section to show the manner in which the locking or retaining ring will be compressed and forced into the annular recess or groove in one end of the inner race member or cone;

Figure 6 is a fragmentary diametrical sectional view showing the manner in which the locking ring is arranged prior to the seating thereof within the annular groove formed in the inner race or cone member at one end thereof;

Figure 7 is a top elevational view of a modified form of the invention in which a fixture or compressing die member similar to the one shown in Figures 1, 2, 3 and 5 is employed for seating a locking or retaining ring of L-shaped cross-section in a peripheral groove in one of the race members of the bearing assembly, the bearing being shown in position with portions thereof broken away to illustrate the manner in which the forming die members are forced into engagement with the locking or retaining ring at circumferentially spaced apart angular distances in a direction perpendicular to the peripheral surface of said ring to thereby seat a portion of said ring in said peripheral groove with the remaining portion seated on an adjacent land surface;

Figure 8 is a vertical cross-sectional view taken on line 7—7 of Figure 7 looking in the direction of the arrows and further showing the manner in which the assembled bearing parts are arranged on the compressing and forming die member so as to seat said locking ring of L-shaped section in an annular groove in the inner race member of said bearing assembly with a portion thereof seated on a land surface adjacent the annular groove;

Figure 9 is a vertical cross-sectional view similar to Figure 8 showing the manner in which the locking ring of L-shaped section is supported by the compressing fixture or die member prior to the seating thereof within the annular groove in one end of the inner race member or cone;

Figure 10 is a vertical fragmentary cross-sectional view of the modified form of the invention showing the same greatly enlarged to illustrate the manner in which a portion of the retaining ring of L-shaped section is compressed so that a portion thereof will be received in an annular groove formed at one end of the inner race member or cone while the other portion is compressed so as to tightly engage and closely hug the land adjacent the annular recess or groove;

Figure 11 is a fragmentary diametrical sectional view of a bearing assembly in accordance with the modified form of the invention showing the retaining or locking ring of L-shaped cross-section positioned relative to the inner race member or cone prior to the compression thereof radially to seat a portion of the L-shaped retaining or locking ring in the annular groove so that the remaining portion may tightly engage and hug the land adjacent thereto;

Figure 12 is a top elevational view of another modified form of the invention showing an expansible forming member for expanding the locking rings on the outer race member of a bearing assembly;

Figure 13 is a vertical cross-sectional view taken diametrically of Figure 12 showing the manner in which the outer bearing race member is positioned on the expansible forming member for receiving the continuous locking ring prior to the expansion thereof into an annular recess in one end of said race member;

Figure 14 is a vertical cross-sectional view similar to Figure 13 showing the expansible forming member and locking ring after the forming member has been expanded to seat the locking ring on one end of the outer race member;

Figure 15 is a vertical cross-sectional view similar to Figures 13 and 14 showing the outer race member reversed and arranged on the expansible forming member for seating another locking ring on the other end of said outer race member; and Figure 16 is a diametrical cross-sectional view of a still further modified form of the invention showing a roller bearing assembly with locking rings on the ends of the outer race member and a single locking ring on the inner race member cooperating with a flange on one end of the inner race member to retain the bearing unit in assembled relation.

*Detailed description of the locking ring compressing apparatus shown in Figures 1, 2, 3, 5, 7, 8 and 9*

In the drawing, attention is first directed to Figures 1, 2, 3, 5, 7, 8 and 9 wherein there is shown an apparatus for carrying out the preferred form of the invention in Figures 1 to 8, and a modified form thereof in Figures 7 to 11 inclusive, but it is to be understood that other forms of apparatus may be employed without departing from the invention and the process thereof. Since the apparatus for carrying out the forms of the invention as shown in Figures 1 to 6 and 7 to 10 is identical, a description of the apparatus in one will suffice for both. In Figures 1, 2, 3, 5, 7, 8, and 9, there is shown an apparatus 5 comprising an annular shell-like member 6 having a tapered bore 7 and a bottom wall (not shown). Extending upwardly from the central portion of the bottom wall is an inverted frusto-conical member 8 which may be attached to the floor of the annular member 6 and may be formed as an integral part thereof. Extending inwardly and radially from the tapered bore 7 is a series of inwardly extending projections 9 which are arranged in circumferentially spaced apart relation and said inwardly and radially extending projections 9 may be integrated with the inverted frusto-conical member 8 or otherwise secured thereto.

Slidably mounted between the inwardly extending projecting ribs or webs 9 is a series of circumferentially spaced jaw members 10 which are provided with inclined outer surfaces 11 adapted to engage the inclined or tapered portion of the bore 7, and said jaw members are also provided with downwardly extending portions 12 having tapered surfaces 13 engaging the frusto-conical member 8. The innermost portions of the jaw members 10 are arcuately curved as at 14 to conform to the contour of the locking or retaining ring in a manner which will be hereinafter more fully described. Jaw projections 15 are formed on the jaw members 10 and extend upwardly above the top edge thereof as shown clearly in Figures 2 and 3.

Reciprocably mounted within a central opening 16 in the frusto-conical member 8 is a plunger rod 17 having an enlarged head portion 18 and a radially extending flange 19 which is adapted to be received in notches or recesses 20 formed in the inner walls of the jaw members 10. The central bore 16 in the inverted frusto-conical member 8 is enlarged as at 21 to form an abutment shoulder 22 for a coil spring 23 which is arranged in said enlarged bore portion 21 and encircles the reciprocating plunger 17 so that the upper end thereof will abut against the enlarged portion 18 of the reciprocating plunger 17. The enlarged portion 18 of the reciprocating plunger is provided with a central recess 24 forming an annular upstanding flange 25 to provide a seat upon which the retaining ring may be positioned prior to the compression thereof as shown in Figure 3. It will thus be seen that downward pressure exerted on the enlarged head 18 will move the jaw members 10 downwardly and inwardly by reason of the inclined cooperating and mutually engaging surfaces 7 and 11 of the compressing fixture 5 and jaw members 10.

In order to exert a downward pressure on the enlarged head portion 18 of the compressing die member, a plunger member 26 is supported in the recess 24 on the upper surface of said enlarged head 18 so that by exerting a downward pressure on the enlarged head portion 27 of said plunger 26 in the direction of the arrows indicated in Figure 2, the enlarged head 18 will be moved downwardly against the action of the coil spring 23. Encircling the plunger 26 is a cylindrical clamping member 28 having a flanged portion 29 at the upper end thereof and said cylindrical clamping member 28 is provided with an inturned flange 30 at the lower end thereof having a bore 31 for receiving the plunger 26. An enlarged bore 32 is formed in the cylindrical clamping member 28 and is adapted to receive a coil spring 33 which is in encircling relation with the plunger 26 and has one end abutting the inturned flange 30 and the other end abutting the undersurface or shoulder of the enlarged plunger head 27. A transverse pin 34 extends through an opening 35 in the enlarged head portion 27 of the plunger 26 and has its end projecting therefrom for reception in vertically arranged elongated slots 36 extending radially from the bore 37 of the annular flange or head 29.

*Detailed description of the form of the invention shown in Figures 1 to 6 inclusive*

The bearing assembly is adapted to be arranged and positioned on the forming and compressing die member as shown in Figures 1 to 3 inclusive and comprises an inner race member 38 having a central opening or bore 39 for being positioned and locked on a shaft when in use. One end of the inner race member or cone 38 is provided with a radially extending flange or shoulder 40 and the opposite end is reduced in diameter as at 41 as shown clearly in Figures 4 and 6. The outer peripheral surface 42 of the inner race member or cone 38 is of an increased diameter as shown in Figure 4, and formed between the diameters 41 and 42 of the inner cone or race member is an inwardly extending annular recess or groove 43 which is adapted to receive a continuous locking or retaining ring 44 which is of uniform cross-section and preferably of rectangular section as shown in Figure 4. The inner diameter 50 of the retaining ring 44 is slightly greater than the outer diameter of the reduced portion 41 so as to permit said locking ring to slide thereover with ease and facility.

The outer race member 45 is provided with inwardly directed flanges or shoulders 46 and 47 to provide a raceway 48 therebetween so that a series of anti-friction rollers 49 may be positioned therein and between the raceway 48 and inner race member or cone 38.

*Method of assembling the retaining ring in Figures 1 to 6 inclusive*

After the inner and outer race members 38 and 45 of the bearing assembly have thus been arranged with the anti-friction rollers or the like 49 positioned therebetween as above described, the assembly is positioned on top of the retaining ring 44 as shown in Figure 3. In this position, the retaining ring 44 which has previously been placed upon the annular upstanding flange 25 of the enlarged head 18 will seat against the shoulder formed by the different diameters 41 and 42 of the inner race member 38 and permit the reduced diameter 41 thereof to pass downwardly through the slightly enlarged opening 50 of the retaining ring 44 so as to rest upon and be supported on the annular upstanding flange 25 and simultaneously support the outer race member 45 and anti-friction rollers 49 so as to temporarily hold the bearing parts in assembled relation.

After the inner and outer race members and anti-friction rollers 49 have thus been positioned, the plunger 26 and encircling casing 28 are positioned within the opening 39 of the inner race member 38 in such a manner that the annular flange 29 of the encircling casing 28 will engage the top edge of the inner race member 38 while the plunger 26 will engage the floor of the recess 24 and the enlarged reciprocating plunger head 18. With the plunger 26 thus positioned, force may be exerted downwardly upon the enlarged head 27 of the plunger 26 by means of a suitable press (not shown) so as to force said plunger downwardly from the position shown in Figure 3 to that shown in Figure 2. As the plunger 26 is forced downwardly, the inner race member 38 is yieldingly clamped in position between the retaining ring 44 and the enlarged portion or flange 29 of the encircling casing 28. Simultaneously, the enlarged head 18 of the reciprocating plunger 17 will move downwardly, carrying with it the radially movable jaw members 10 and causing the upstanding jaw portions 15 thereof to engage the peripheral surface of the locking and retaining ring 44 so as to exert a radial inward pressure thereon at circumferentially spaced angular distances in a direction perpendicular to the peripheral surface of the locking ring. The increased force exerted on the locking ring 44 by the upstanding jaw portion 15 causes said locking or retaining ring 44 to be compressed and seated within the groove 43 of the inner bearing race member 38. It is to be noted that the arcuately curved surfaces 14 are on a radius smaller than the radius of the outer peripheral surface of the clamping ring 44 so that when said clamping jaw extensions 15 are contracted, the arcuate surface 14 will conform to the reduced radius of the clamping ring.

When the clamping ring has thus been seated, the pressure on the enlarged head 27 of the plunger 26 is released so that the coil spring 23 will yieldingly urge the enlarged head 18 of the reciprocating plunger upwardly and thereby carry with it the radially movable compression jaws 10 and cause the same to separate so that the jaw projections 15 will be disengaged from the peripheral surface of the clamping ring 44. With the pressure thus relieved, the plunger 26 and encircling casing 28 may be removed and the assembled bearing structure with the locking ring 44 likewise removed.

It has been found by experiment that the locking ring 44 may be compressed so as to seat within the annular recess or groove 43 of the inner race member or cone 38 so as to be permanently received therein, and that the locking ring 44 will be prevented from displacement when the bearing assembly is subjected to axial thrusts in special service.

*Detailed description of the modification shown in Figures 7 to 11 inclusive*

The bearing assembly is arranged on the forming and compressing die as shown in Figures 7 to 9 inclusive and includes an inner race member 38a having an opening 39a to facilitate mounting of the bearing assembly upon a shaft or the like. The peripheral surface 40a is machined to provide a roller raceway and a radially extending flange or shoulder 41a is formed at one end of the inner race member 38a to engage the radial walls of a series of anti-friction rollers or the like as at 42a arranged around the peripheral surface 40a of the inner race member. The outer race member 43a is provided with a raceway 44a for receiving the anti-friction rollers 42a and is formed with shoulders 45a at each end thereof.

The inner race member 38a is provided at one end with a diametrically reduced portion 46a which is smaller in diameter than the raceway surface 40a as shown best in Figure 10. The reduced surface 46a provides a land adjacent one end of the inner race member 38a. Formed between the raceway surface 40a and the diametrically reduced surface 46a is a circumferentially extending annular groove 47a which is adapted to receive a portion of the retaining or locking ring and connects with the raceway surface 40a by means of a radial wall 48a. The retaining ring 49a is of L-shaped section and is constructed of a continuous uninterrupted annulus having a radially extending projection 50a at one end thereof which is adapted to be received in the groove 47a. It is noted that the groove 47a has a depth of a greater size than the radial annular projection 50a on the locking or retaining ring 49a so that when said ring is clamped or compressed into position, the surface 51a of the clamping or retaining ring will tightly engage or hug the land 46 and thereby withstand axial bearing thrusts of considerable force exerted axially of the bearing assembly. The corners of the groove 47a may be unfinished but since the annular groove or recess 37a is of a greater depth than the annular projection 50a on the locking or retaining ring 49a, the inner edge thereof will never contact the floor of the annular recess 47a by reason of the wall portion 51a tightly engaging and being compressed into contact with the land surface 46a so as to tightly hug and grip the same when the locking and clamping ring is in position.

*Method of assembling the component bearing parts as shown in Figures 7 to 11 inclusive*

Returning to the compressing and forming die shown in Figures 7 to 9, it will be seen that the clamping ring 49a may be disposed on the annular shoulder 25 of the enlarged head 18 with the jaw members 10 held in an elevated position by the yielding action of the coil spring 23. The locking and retaining ring 49a is placed on the annular flange 25 of the enlarged head 18 and between the extensions 15 of the jaw member 10 as shown clearly in Figure 9. Next, the bearing assembly, including the inner and outer race members 38a and 43a as well as the anti-friction rollers 42a are placed face downwardly upon the die-forming or compressing apparatus by passing the land surface 46a through the opening in the locking ring 49a which, it is to be noted, is of a slightly increased diameter than the land surface so as to permit the land surface to slide freely therethrough. As the bearing assembly is positioned face downwardly on the compressing and die forming apparatus, the jaw projections 15 of the jaw members 10 will engage the radial walls of the anti-friction rollers 42a so that the inner jaw surfaces thereof will engage the peripheral wall of the locking and retaining ring 49a.

After the component bearing parts have thus been placed face-downwardly upon the compressing and die forming apparatus, the plunger 26 is arranged so as to engage the enlarged head 18 of the reciprocating plunger 17 and so that the encircling casing 28 thereof is centered within the opening 39 in the inner race member 38. As shown in Figure 11, the locking and retaining ring 49a will engage the shoulder 48a of the inner race member 38a and will likewise engage the anti-friction rollers 42a so as to hold the component bearing parts temporarily assembled until pressure is applied by means of a screw press or the like to the enlarged head 27 of the plunger 26.

When pressure is applied to the enlarged head 27 of the plunger 26, in the direction of the arrows shown in Figure 8, the flange 29 of the encircling casing 28 will engage the top edge of the inner race member 38a and further hold the bearing parts temporarily assembled. As the pressure continues downwardly, the jaw members 10 are moved downwardly and radially inward so that the jaw projections 15 will engage and compress the locking and retaining ring 49a about its entire circumference so as to reduce the diameter thereof and force the locking and retaining ring 49a into position with respect to the inner race member 38a so that the annular projection 50a will be received in the annular recess 47a and that the surface 51a of the locking ring 49a will be moved into contactual engagement with the land surface 46a of said inner race member 38a. It has been found that the surface 51a of the locking and retaining ring 49a will tightly engage the land surface 46a so as to clamp the ring 49a into contactual engagement therewith while the annular flange 50a will be disposed in locking engagement with the annular recess 47a.

After the locking and retaining ring has thus been compressed and diametrically reduced so as to be permanently seated with the annular projection 50a and received in the annular groove or recess 47a, and the wall 51a thereof arranged in clamping and contactual engagement with the land 46a of the inner race member 38a, the pressure on the plunger 26 is relieved and the plunger encircling casing 28 and plunger removed, the jaw members 10 will be yieldingly urged upwardly so as to move radially outward from engagement with the outer peripheral surface of the locking and retaining ring 49a. Thus, the bearing assembly is free to be removed and the anti-friction rollers 42a will be held in assembled relation by means of the locking ring 49a which will have been permanently set in the position as above indicated.

*Description of further modified form of invention shown in Figures 12 to 15 inclusive*

In the form of the invention shown in Figures 12 to 15 inclusive, the invention is shown as applied to the outer race member of an anti-friction bearing and although the process is similar to that shown in Figures 1 to 11 inclusive, a slightly modified compression and deforming apparatus is required. As shown in Figures 12 to 15, a series of expansible forming and expanding members 60 are provided and said forming members are arcuately curved on a radius slightly smaller than the radius of the bearing member from the axis thereof to the inner periphery of the outer race member to insure proper positioning of the locking ring and the complete seating thereof in a manner which will be presently described.

As noted in Figures 12 to 15, the arcuately curved forming members 60 are adapted to be arranged in circumferential relation for receiving the outer race member of a bearing structure, and when so arranged, can be placed over an expansion chuck or the like so as to exert an outward radial force on the forming and expanding members. Since any suitable expanding means can be provided for expanding the forming members, the same is not shown or described in detail.

Each of the expanding and forming members 60 includes a body portion 61 having a radially extending flange 62 at the lower end thereof for supporting the outer race member when the same is placed thereon preparatory to the expansion of the locking ring into the annular recess or groove in the race member The upper surface of the flanges of the expanding and forming member 60 is provided with a locking ring engaging surface 63 and a surface 64 for engaging the edge of the bearing race member so as to support the race member and locking ring while the locking ring is being expanded. The outer curved surface of each expanding and forming member is divided into a portion 65 for engaging the inner diameter of the locking ring and a reduced portion 66 to facilitate the reversal of the race member when seating a locking ring on the other end of said race member.

The outer race member 67 consists of an annulus having a machined raceway portion 68 and machined land surfaces 69 of a slightly larger diameter than the diameter of the raceway surface 68. The raceway surface 68 is separated from the land surfaces 69 by annular grooves 70 which are formed adjacent the ends of the outer race member and are of a size to receive a continuous locking and retaining ring 71 of L-shaped cross-section with one of its flanges 72 interlockingly received in said annular groove and the other flange 73 seated on said land surface in tight contactual engagement therewith. The L-shaped locking ring 71 is substantially the same as that shown in the form of the invention illustrated and described in connection with the form of the invention shown in Figures 7 to 11 inclusive. This structure eliminates the machining of the outer race member to provide shoulders thereon adjacent the ends of said race member for engaging the end walls of the anti-friction bearing elements. It is to be understood that the continuous locking ring 71 has an outer diameter of a size slightly smaller than the diameter of the land surface 69 so as to allow free passage thereover.

*Method of assembling locking rings on the outer race members of bearing assemblies—Figures 12 to 15 inclusive*

As shown in Figure 13, the continuous locking ring 71 is placed on the supporting surface 73 and the outer race member of a bearing structure is placed so that it will be supported on the upper surface of the flange 62 with one of the grooves 70 in registry with the locking ring 71. After the locking ring and outer race member have been thus arranged, outward force is exerted on the expanding and forming members 60 in a radial direction as shown by the arrows in Figure 12. Upon expansion of the forming members 60, the locking and retaining ring is likewise expanded so that the flange 72 will be interlockingly received in one of the grooves 70 with the remaining flange 73 in contactual engagement with the land surface 63. When the locking ring 71 has been placed on one end of the outer race member, the bearing race member is removed and another locking ring is positioned on the surface 63 of the flange 62 so that by inverting the outer race member 67 and again placing the same over the locking ring previously placed on the supporting flange 62, the operation may be repeated so as to provide locking rings adjacent both ends of the outer race member. It is to be noted that when applying the second locking ring to the other end of the race member, as shown in Figure 15, the previously seated locking ring will not be engaged by the reduced surface 66 of the arcuately curved expanding and forming members 61.

Further modification is shown in Figure 16, wherein the outer race member 68a of the bearing assembly is provided adjacent each end with annular grooves 70a, and locking rings 71a are seated in said grooves in substantially the same manner as described in connection with the form of the invention shown in Figures 12 to 15 inclusive, while the inner race member 75a is formed in the manner shown and described in the form of the invention illustrated in Figures 1 to 6 inclusive to form a complete bearing assembly.

By employing the methods set forth in Figures 1 to 15 inclusive, various bearing assemblies can be made up with the locking rings on one end of one of the race members and flanges on the other, or locking rings on both race members to supplement the radial flanges adjacent the ends thereof. Obviously, the bearing assembly can be made up by providing locking rings of the plain type on both ends of the inner or outer race members and locking rings of the L-shaped type on either the inner or outer race members. In addition, the locking rings shown in Figures 12 to 15 may be placed on both ends of the inner race member as well as the outer race member as shown.

It is to be understood that the forms of the invention herewith shown and described are to be taken as preferred embodiments of the same and that various changes may be made in the shape, size and arrangement of parts without de-

What I claim is:

1. A method of assembling bearing units having inner and outer race members arranged concentrically in spaced relation for receiving anti-friction bearing members therebetween, comprising removing the metal adjacent the end of one of said race members to provide an annular groove therein, forming a locking ring of radially-elongated cross-section and with outer and inner diameters of dimensions adapted to slide between said race members, moving said locking ring through the space between said race members into registry with the groove in said race member, and finally exerting a ring-deforming pressure radially on one edge of said ring to deform said ring edgewise into said groove.

2. A method of assembling bearing units having inner and outer race members arranged concentrically in spaced relation for receiving anti-friction bearing members therebetween, comprising machining a portion of reduced diameter on said inner race member adjacent one end thereof, forming a locking ring of radially-elongated cross-section and of an inner diameter slidable over said reduced diameter portion, forming an annular groove in said reduced diameter portion, sliding the locking ring over the reduced diameter portion of said race member to a position of registry with said groove, and finally exerting a radial ring-deforming pressure on the peripheral edge of said locking ring to deform said ring edgewise into said groove.

3. A method of making anti-friction bearings having inner and outer race members arranged in concentric relation with a series of anti-friction elements therebetween, comprising machining the end of one of said race members to provide an annular groove thereon and an axially-extending land surface of a predetermined diameter, forming a retainer ring of L-shaped section with a radially-projecting annular portion and of a diameter to slide past said land surface, positioning said retainer ring so that said radially projecting portion of said L-shaped section is in registry with said annular groove, and finally exerting a radial ring-deforming force on one edge of said retainer ring to deform said annularly-projecting portion edgewise into said groove and also to deform said other portion of the L-shaped section edgewise into tight clamping engagement with said land surface of predetermined diameter.

4. A method of making anti-friction bearing assemblies having inner and outer race members arranged in concentric relation with anti-friction rollers disposed therebetween, comprising machining the end of one of said race members to provide a groove and a land surface thereon of a different diameter from the diameter of said end, forming a retainer ring of a diameter to slide past said land surface and of L-section with a radially projecting annular extension, moving said ring through the space between said races into registry with said groove and the remaining portion disposed opposite the land surface, and finally exerting pressure on the periphery of said retainer ring edgewise in a radial direction, to deform said ring edgewise into engagement with the grooves race member with the annular projection received in said groove and the remaining portion in contactual engagement with said land surface.

GLEN F. JOHNSON.

REFERENCES CITED

The following references are of record in the file of this patent:

UNITED STATES PATENTS

| Number | Name | Date |
| --- | --- | --- |
| 1,200,445 | Laycock | Oct. 3, 1916 |
| 1,350,325 | Miller | Aug. 24, 1920 |
| 1,617,319 | Buckwalter | Feb. 15, 1927 |
| 1,621,095 | Utter | Mar. 15, 1935 |
| 1,630,339 | Ganster | May 31, 1927 |
| 1,736,959 | Gibbons | Nov. 26, 1929 |
| 1,738,984 | Brown | Dec. 10, 1929 |
| 1,803,966 | Gibbons | May 5, 1931 |
| 1,991,723 | Betz | Feb. 19, 1935 |
| 2,225,345 | Lamoreaux | Dec. 17, 1940 |
| 2,382,359 | Weightman | Aug. 14, 1945 |